US012571379B1

(12) United States Patent
Cornett et al.

(10) Patent No.: US 12,571,379 B1
(45) Date of Patent: Mar. 10, 2026

(54) PUMP PACKING MONITORING SYSTEM

(71) Applicant: NexTier Completion Solutions Inc.,
Houston, TX (US)

(72) Inventors: Sean Cornett, Midland, TX (US);
Andrew Cox, Houston, TX (US)

(73) Assignee: NexTier Completion Solutions Inc.,
Houston, TX (US)

( * ) Notice: Subject to any disclaimer, the term of this
patent is extended or adjusted under 35
U.S.C. 154(b) by 160 days.

(21) Appl. No.: 18/486,025

(22) Filed: Oct. 12, 2023

Related U.S. Application Data

(60) Provisional application No. 63/379,246, filed on Oct.
12, 2022.

(51) Int. Cl.
| *F04B 1/122* | (2020.01) |
| *F04B 51/00* | (2006.01) |
| *F04B 53/02* | (2006.01) |
| *F04B 53/18* | (2006.01) |
| *G01M 13/005* | (2019.01) |

(52) U.S. Cl.
CPC .............. *F04B 1/122* (2013.01); *F04B 51/00*
(2013.01); *F04B 53/02* (2013.01); *F04B 53/18*
(2013.01); *G01M 13/005* (2013.01)

(58) Field of Classification Search
CPC ....... G01M 13/005; F04B 51/00; F04B 53/02;
F04B 53/18; F04B 1/122
See application file for complete search history.

(56) References Cited

U.S. PATENT DOCUMENTS

| 3,834,715 A * | 9/1974 | Butler .................... F16J 15/40 |
| | | 277/516 |
| 4,229,011 A * | 10/1980 | Wikelski ............... F16J 15/441 |
| | | 277/432 |
| 6,817,228 B2 * | 11/2004 | Upton ................... F16J 15/004 |
| | | 277/318 |
| 8,991,423 B2 * | 3/2015 | Matsukawa ........ F02M 21/0221 |
| | | 137/557 |
| 9,127,577 B2 * | 9/2015 | Donald ................... F04B 53/18 |
| 10,436,766 B1 * | 10/2019 | Bayyouk ................ F04B 17/05 |
| 2021/0040836 A1 * | 2/2021 | Baskin ............... E21B 43/2607 |
| 2021/0381537 A1 | 12/2021 | Mullet et al. |
| 2024/0263630 A1 * | 8/2024 | Zuo ......................... F16N 29/02 |

FOREIGN PATENT DOCUMENTS

WO        2020003206 A1    1/2020

* cited by examiner

*Primary Examiner* — Charles G Freay
(74) *Attorney, Agent, or Firm* — AVEK IP, LLC

(57) ABSTRACT

A packing health monitoring system for a pump includes an
isolation block arrangement having first and second connec-
tions, an integrated check valve, and means for securing the
isolation block to a fluid end of the pump. A lubrication line
which is coupled to a lubricant source connects to one of the
first and second connections. A pressure sensor connects to
the other for the first and second connections. The pressure
sensor is configured to measure a back pressure within the
fluid end. The packing health monitoring system further
includes a control system in data communication with the
pressure sensor; and an alert generator in data communica-
tion with the pressure sensor and the control system. The
alert generator generates a first alert upon the control system
determining the back pressure equals or exceeds a first
predetermined threshold.

13 Claims, 11 Drawing Sheets

200

204

202

208

210

200

202

204

114c

206

120

208

210

Fluid end 104

110a

120a

0 - 1000 PSI Packing Still considered in the healthy Range

110b

120b

1000 - 2000 PSI Packing maintenance required soon

PUMP PACKING MONITORING SYSTEM

CROSS REFERENCE TO RELATED APPLICATIONS

This application claims the benefit of priority of U.S. Provisional Patent Application No. 63/379,246, filed Oct. 12, 2022 and titled "Pump Packing Monitoring System", the disclosure of which is incorporated by reference herein in its entirety.

FIELD OF THE DISCLOSURE

The disclosure relates generally to the field of pumps. More specifically, the disclosure relates to a system for monitoring the condition of packing within a pump.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to an embodiment, a pump includes a fluid end having a bore hole and a plunger configured to pressurize fluid within the bore hole, packing located between the plunger and a side wall of the bore hole, and a packing lubrication system in fluid communication with the packing. The lubrication system has a lubricant source and a valve for selectively allowing flow of lubricant to the packing. The pump further includes a power end configured to provide reciprocating motion to the plunger, and a packing health monitoring system. The packing health monitoring system includes a first pressure sensor located between the bore hole and the valve for measuring a back pressure within the fluid end; a control system in data communication with the first pressure sensor; and an alert generator in data communication with the first pressure sensor and the control system. The alert generator generates a first alert upon the control system determining the back pressure is equal to or exceeds 1000 psi.

In another embodiment, a packing health monitoring system for a pump includes an isolation block arrangement having first and second connections, an integrated check valve, and means for securing the isolation block to a fluid end of the pump. A lubrication line which is coupled to a lubricant source connects to one of the first and second connections. A pressure sensor connects to the other for the first and second connections. The pressure sensor is configured to measure a back pressure within the fluid end. The packing health monitoring system further includes a control system in data communication with the pressure sensor; and an alert generator in data communication with the pressure sensor and the control system. The alert generator generates a first alert upon the control system determining the back pressure equals or exceeds a first predetermined threshold.

BRIEF DESCRIPTION OF THE DRAWINGS

Illustrative embodiments of the invention are described in detail below with reference to the attached figures wherein.

DETAILED DESCRIPTION

Pumps are commonly used in fracturing applications, and typically include a power end and a fluid end which are mechanically coupled. A power end typically includes a power source (e.g., an engine or other similar component) which is configured to create reciprocating motion in the fluid end. Typical fluid end assemblies usually include a housing such as a machined steel block that has a plurality of bore holes which include a piston or plunger which is moved to pressurize fluid within the bore. Each of these bores include packing between the piston and the side wall of the bore, which seals both the fluid and its associated pressure within the confines of the bore. To ensure smooth operation of the plunger, the packing often remains lubricated or greased via a lubricant system.

Pressure within the bore may exceed many thousands of pounds per square inch, and this high pressure combined with general fatigue of the reciprocating plunger causes the packing to deteriorate with time. Replacing the packing is a costly and time-consuming process which causes the pump to be temporarily inoperable, so it is important that users only do so when necessary. However, if the packing completely fails before it is replaced, there may be substantial damage to surrounding components which may prove even less desirable and/or render the fluid end permanently inoperable. Therefore, it may be advantageous for a user to be able to monitor the condition of the packing during operation of the pump in order to maintain the packing at the appropriate service rate and greatly reduce the risk of catastrophic failure.

Figure 1A:
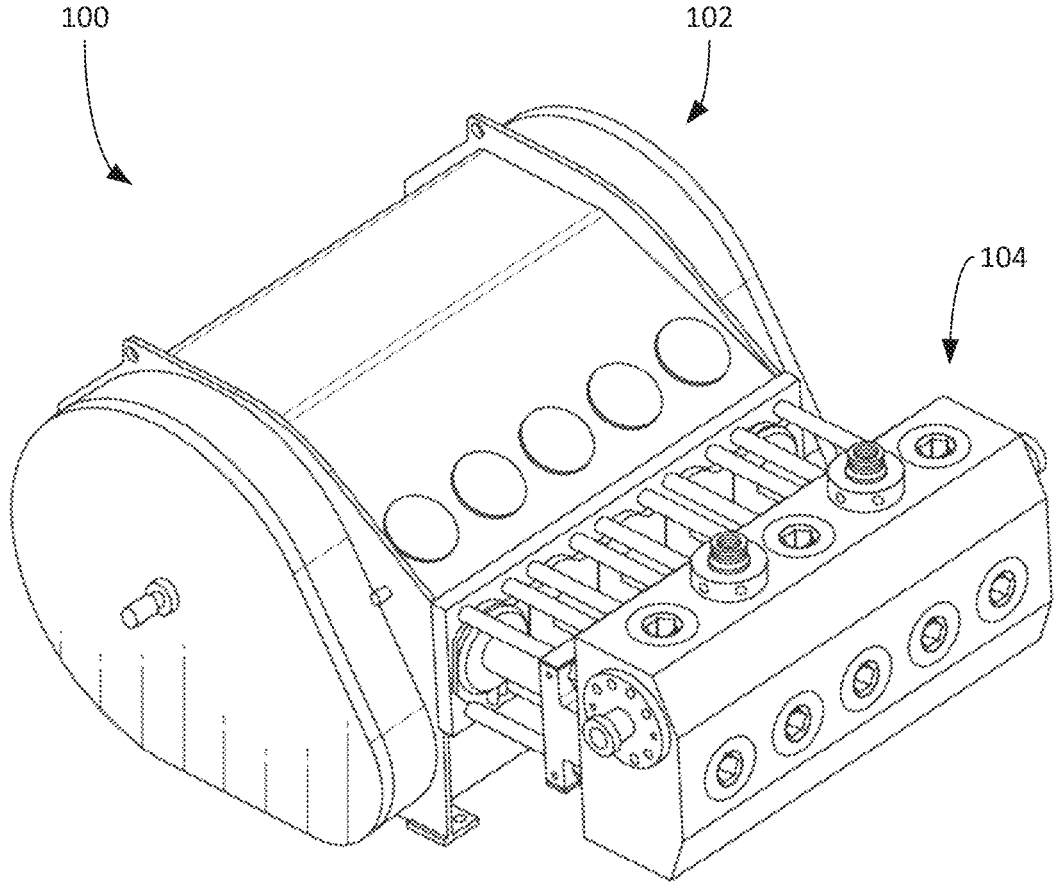
FIGS. 1A and 1B generally illustrate a reciprocating pump as is known within the art.
Figure 1B:
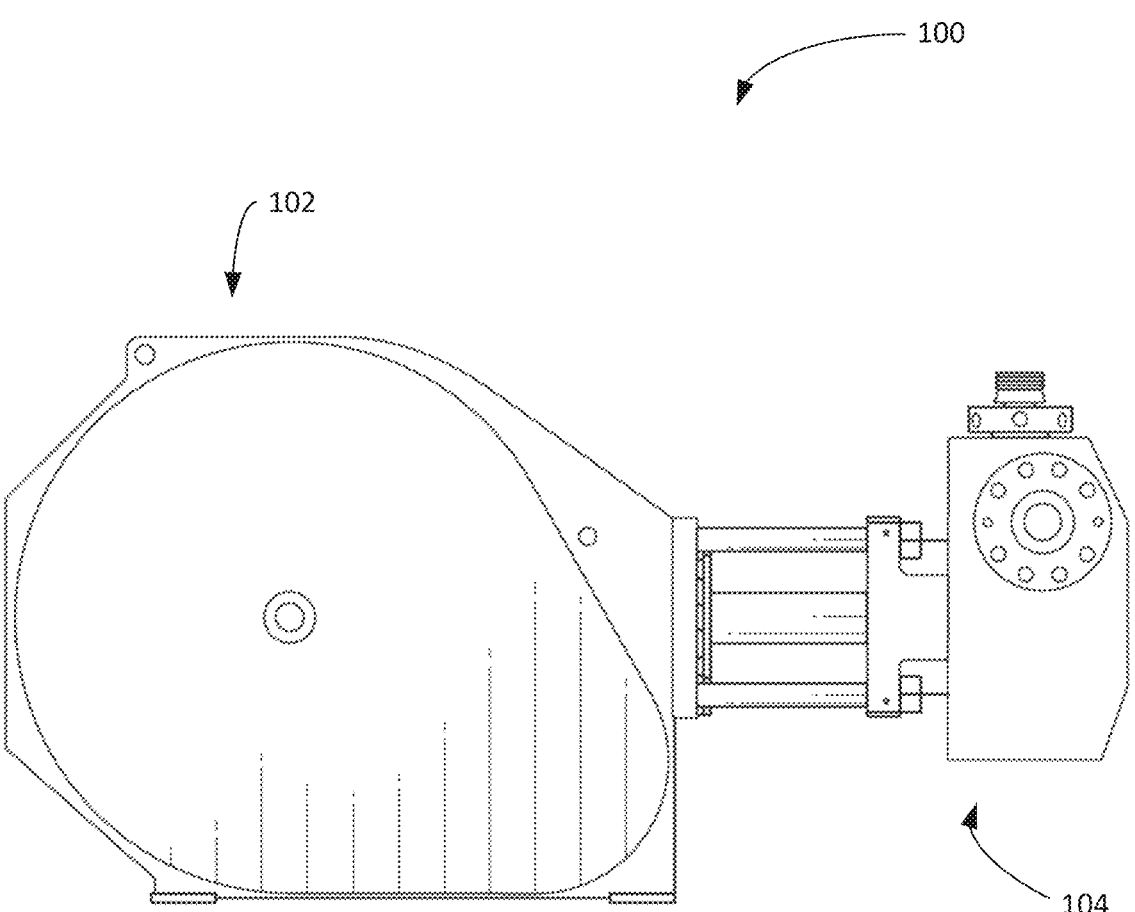
Figure 1C:
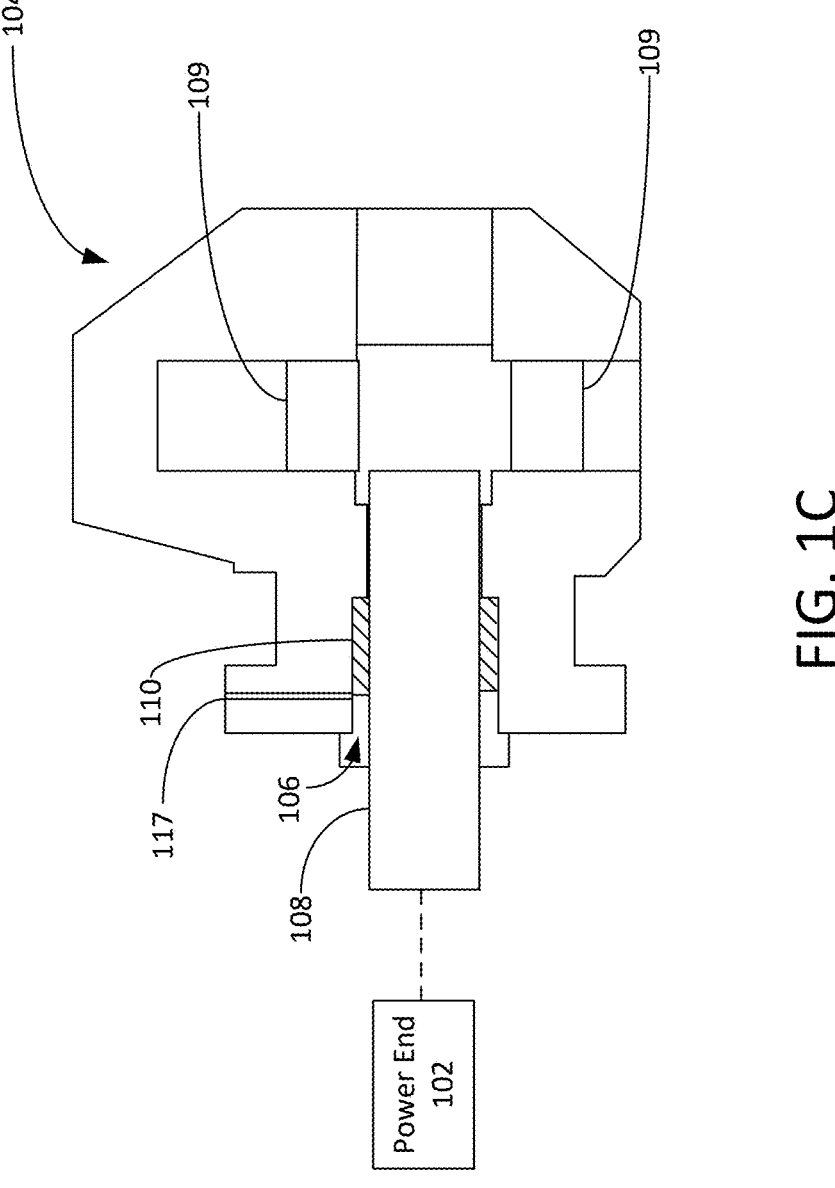
FIG. 1C generally illustrates a piston assembly of a reciprocating pump as is known within the art.

According to an embodiment, a pump 100 includes a power end 102 and a fluid end 104, shown generally in FIGS. 1A and 1B. As is generally illustrated in FIG. 1C, the fluid end 104 includes pistons (also referred to as plungers) 108 and valves 109 that are operable to pressurize fluids to relatively high pressures. Each piston 108 is located within a bore 106 within the fluid end 104, and each bore 106 includes packing 110 which serves to reduce friction and increase stability of the piston 108.

Figure 2:
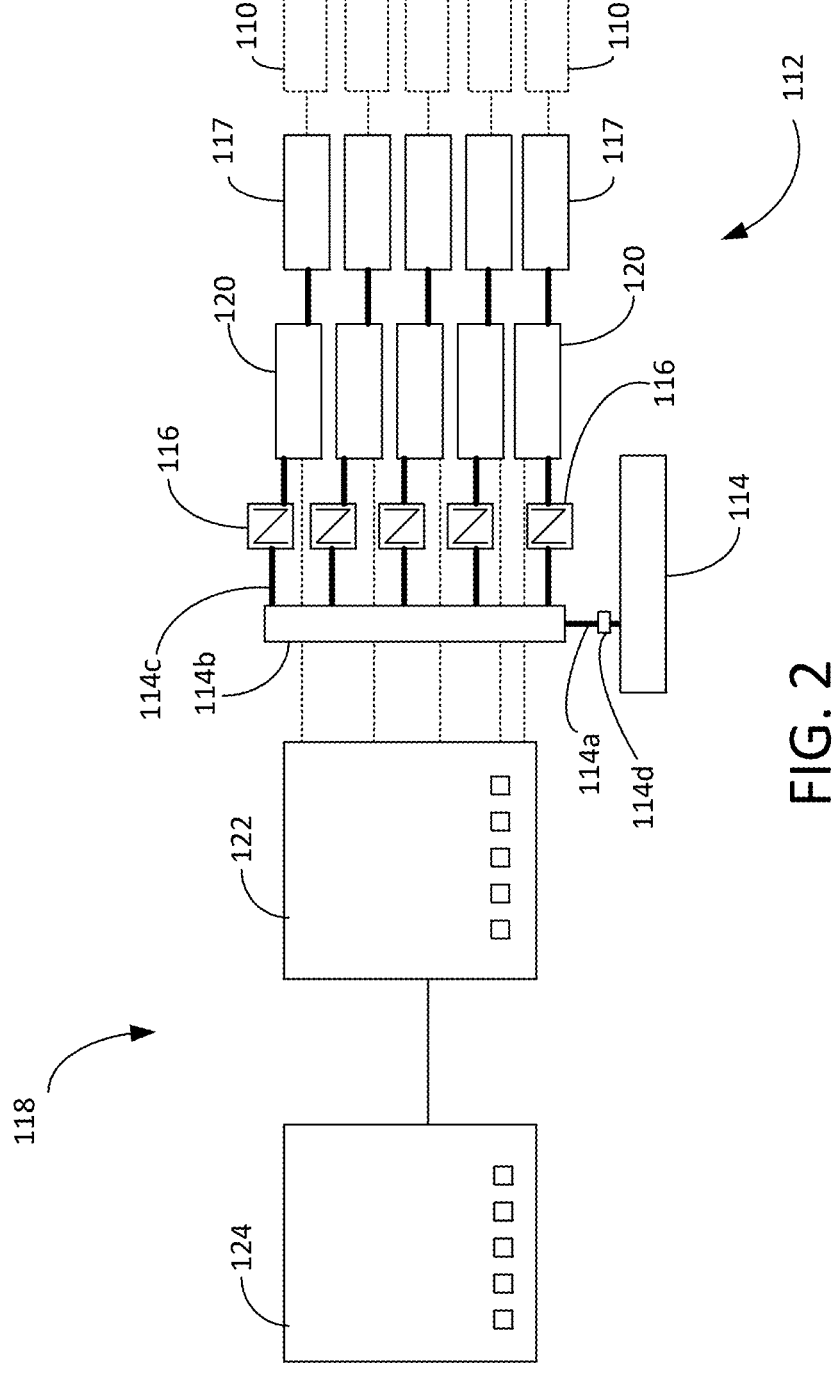
FIG. 2 is a schematic of an embodiment of a pressure-based pump packing condition monitoring system according to an embodiment of the invention.

The packing 110 is preferably lubricated or greased by a packing lubrication system 112, illustrated schematically in FIG. 2, which is in fluid communication with the packing 110. The packing lubrication system 112 preferably includes a lubricant source 114 and one or more valves 116 for controlling the flow of lubricant through the ports 117 to the packing 110. More specifically, the lubrication system 112 may include the lubricant source 114, a main lubrication supply line 114*a*, a lubrication manifold 114*b*, and lubrication supply lines 114*c* extending from the manifold 114*b* to the isolation block 202 which delivers the lubricant to the port 117 (and thereafter to the packing 110 and the piston 108). In some embodiments, a pressure transducer 114*d* may be installed on the main lubrication line 114*a* to measure the main lubrication pressure feeding to the lubrication manifold 114*b*. In its most basic implementation, the pressure transducer 114*d* may simply show operational cycles-if no pressure is generated, then it can be assumed that there is no lubricant (e.g., grease) inside the line 114*a*; if pressure is generated, then there is lubricant inside the line 114*a*. In a more robust implementation, the pressure transducer 114*d* may measure actual pressures in the main lubrication line 114*a*. A pressure reading of 0 to approximately 2000 psi is an indication that lubrication system 112 is working under good conditions. At pressures of approximately 2000 psi to approximately 3000 psi, a warning (e.g., via the alert generator 124) may issue alerting a user that pressure is backing up in the main lubrication line 114*a* which may suggest an issue with the packing 110. At pressures of over 3000 psi, the situation may be considered "critical" and the alert generator 124 may issue a corresponding alert.

A packing health monitoring system 118 monitors the condition of the packing 110 via pressure sensor(s) 120 and a control system 122, and may preferably include one or more alert generators 124 configured to alert the user to the condition of the packing 110 if it is deemed to be unsafe or in need of maintenance. The pressure sensor 120 may be any sensor now known or later developed which may withstand the high pressure that exists within the bore 106. The pressure sensor 120 may be in fluid communication with a component of the lubrication system 112 and in data communication with the control system 122.

In embodiments, the pressure sensor 120 is located generally adjacent the valve 116, between the valve 116 and the dispensing port 117 of the lubrication system 112. The valve 116 may be a check valve which serves to restrict any backflow from the packing 110 and/or the bore 106 into the lubrication system 112. The packing 110, in a primary function, prevents fluid pressure and abrasive fluids from leaking past the piston 108. By placing the pressure sensor 120 generally adjacent the valve 116, the pressure measured by the pressure sensor 120 corresponds to the pressure leak or back pressure that the packing 110 fails to contain. As can be seen in FIGS. 4, 5B, 6B, 7B, and 8 discussed in greater detail below, pressure readings can vary during the stroke of the piston 108, although the pressure sensor 120 is preferably calibrated to extract the maximum pressure during each cycle.

In some embodiments, pressure sensor 120 may be a pressure transducer having an operating range from approximately zero to in excess of 4000 psi, or any transducer whose operating range includes and/or exceeds the maximum fluid pressure within the bore 106 of the pump 100. In other embodiments, the pressure sensor 120 may take the form of a pressure switch, outputting a binary electrical signal to the control system 122 upon detecting a predetermined threshold pressure.

Figure 3A:
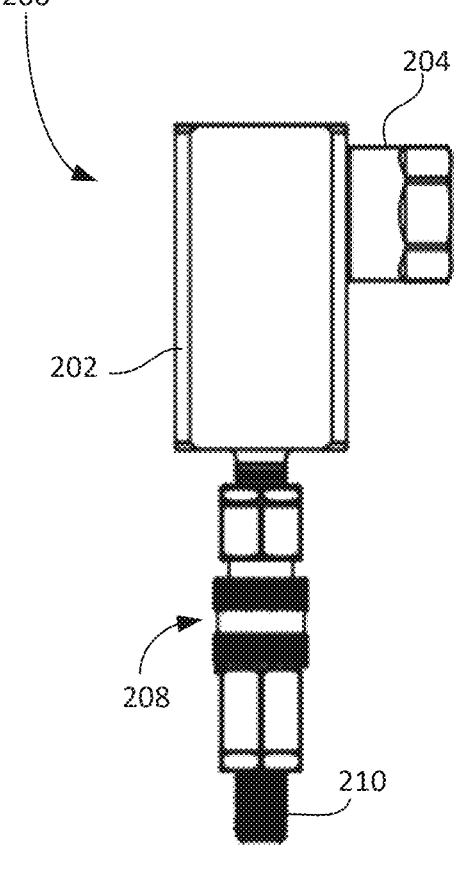
FIGS. 3A-3B illustrate an isolation block arrangement incorporated into the pressure-based pump packing condition monitoring system according to an embodiment of the invention.
Figure 3B:
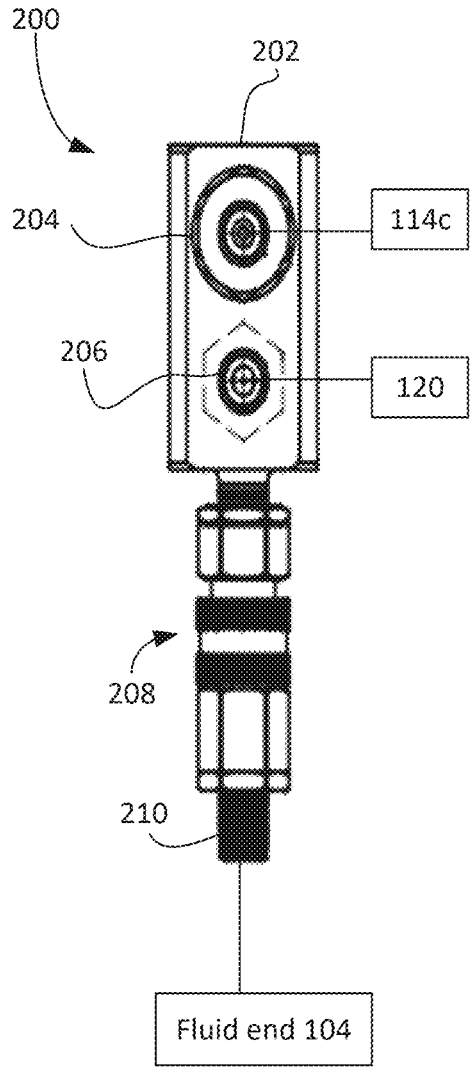
Figure 3C:
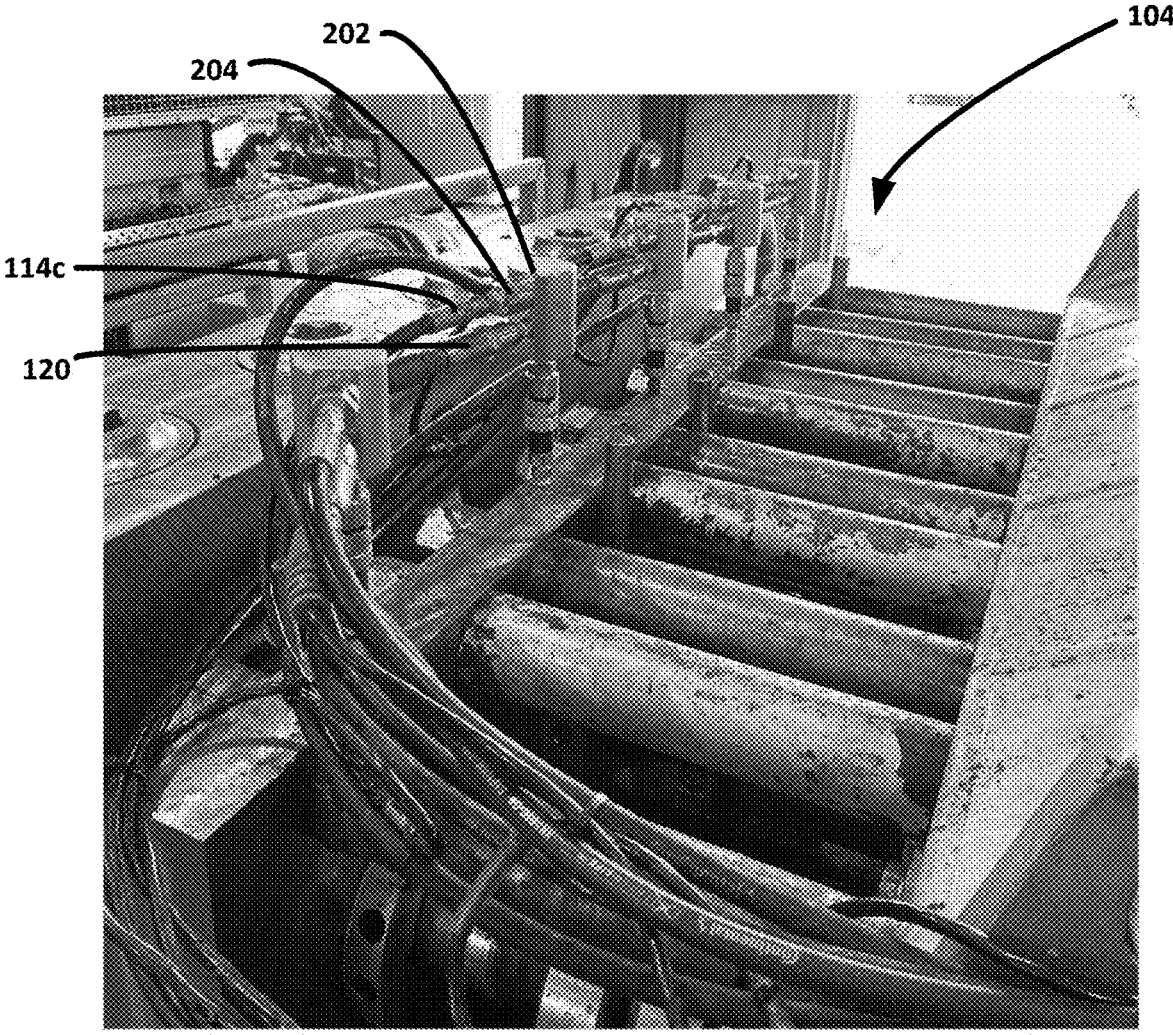
FIG. 3C is a picture of the isolation block arrangement of FIGS. 3A-3B incorporated into a pump according to an embodiment of the invention.

The pressure sensor 120 and the valve 116 may, in some embodiments, be incorporated into an isolation block arrangement 200, illustrated in FIGS. 3A-B, which is configured to quick-connect to the fluid end 104. The isolation block arrangement 200 may have many benefits, including being less environment prone and allowing for faster changing of fluid ends. Additionally, the isolation block arrangement 200 may allow for more consistent labeling between fluid ends to reduce erroneous hookups. With reference to FIGS. 3A-B, the isolation block arrangement 200 includes an isolation block 202 having a grease supply connection 204 and a pressure transducer connection 206. The isolation block 202 includes an integrated check valve to control flow of grease through the isolation block 202. A quick disconnect 208 to an NPT fitting 210 allows the isolation block arrangement 200 to quickly couple to the fluid end 104, and particularly to the fluid end grease bore. The pressure transducer 120 couples to the pressure transducer connection 206, while the lubrication supply line 114*c* couples to the grease supply connection 204. FIG. 3C further illustrates isolation block arrangements 200 coupled to a fluid end 104.

Each pressure sensor 120 is in data communication with an electronic control system 122 which receives signals from the pressure sensor 120. The control system 122 may determine an alert condition based upon the pressure readings supplied by the pressure sensor 120. Consequently, the control system 122 may activate one or more alert generation devices 124 to alert a user to the condition of the packing 110. For example, the control system 122 may trigger the alert generating device 124 if the pressure reading indicates that the packing 110 may have failed due to the pressure reading exceeding a predetermined threshold back pressure (e.g., 1000 psi).

In some embodiments, including but not limited to embodiments wherein the pressure sensor 120 is a pressure switch, the pressure sensor 120 and the alert generating device 124 may be in direct data communication, wherein upon reaching a determined threshold pressure, the pressure switch 120 may activate the alert generating device 124 via an electrical signal. This signal may then remain active until a user addresses any issues.

The control system 122 may be in wired or wireless communication with the sensor 120. The control system may be a data acquisition system (DAQ) which is configured to receive inputs from the pressure sensor 120. In some embodiments, the control system 122 is a computer system comprising a processor and non-transitory computer memory. In these embodiments, the non-transitory computer memory may contain programming which includes a plurality of alert conditions corresponding to a variety of packing conditions as described above. For example, the control system 122 may include a first alert condition directed to back pressure measurements of e.g., zero to approximately 1000 psi and/or lubrication line pressures of e.g., zero to approximately 2000 psi. In this instance, the alert generating device 124 may not be activated, as there is no need for immediate service. Alternatively, the alert generating device 124 may have an "all clear" indicator (e.g., a green light or other suitable indicator) to readily convey to users that the system is operating within the desired thresholds.

The control system 122 may include a second alert condition, corresponding to back pressure measurements of e.g., approximately 1000 to 2000 psi and/or lubrication line pressures of e.g., approximately 2000 psi to approximately 3000 psi. The second alert condition may indicate that the packing may be deteriorated to the point where maintenance is required, but that there is no catastrophic failure. Likewise, the control system may include a third alert condition, corresponding back pressure measurements of greater than e.g., 2000 psi and/or lubrication line pressures of e.g., in excess of approximately 3000 psi, which may indicate that the packing has failed, that failure is imminent, and/or the fluid end has sustained damage and operation of the pump must stop immediately. Again, those of skill in the art will appreciate that in other embodiments having different pump and/or packing configurations, the specific pressure ranges described herein may vary without departing from the scope of the invention.

In some embodiments, the alert generating device 124 may be an audial indicator, such as an audible alarm, siren, or other similar device known in the art. In other embodiments, the alert generating device 124 may be a light or similar device which activates upon satisfaction of an alert condition. The packing health monitoring system 118 may include one or more displays 126. The display 126 may show pressure information gathered by the pressure sensor(s) 120 and allow the user to view the pressure values in real-time. The display 126 may also be configured to act as an alert generating device 124 by displaying one or more visual indicators in the event that an alert condition is met. In some embodiments, the control system 122 may be a laptop or desktop personal computer, and the control system 122, alert generating device 124, and display 126 may be included as part of the personal computer.

In embodiments where a plurality of bore holes 106 are included in the fluid end 104, each bore 106 may contain its own packing 110 and pressure sensor 120. In these embodiments, the control system 122 may compare the back pressure readings from each bore, and determine the maximum back pressure across all bore holes for each cycle of the pump's operation. The alert condition which may be used to activate the alert generating device 124 may be determined solely using this maximum back pressure reading because it corresponds to a worst-case scenario. The pressure readings from each bore's pressure sensor 120 may be overlaid on the display 126 such that the user may be able to quickly discern the state of the packing in real time, if desired. Moreover, the user may be able to determine which of the packing is offending such that it can be addressed immediately, while the other packing may have usable life.

Figure 4:
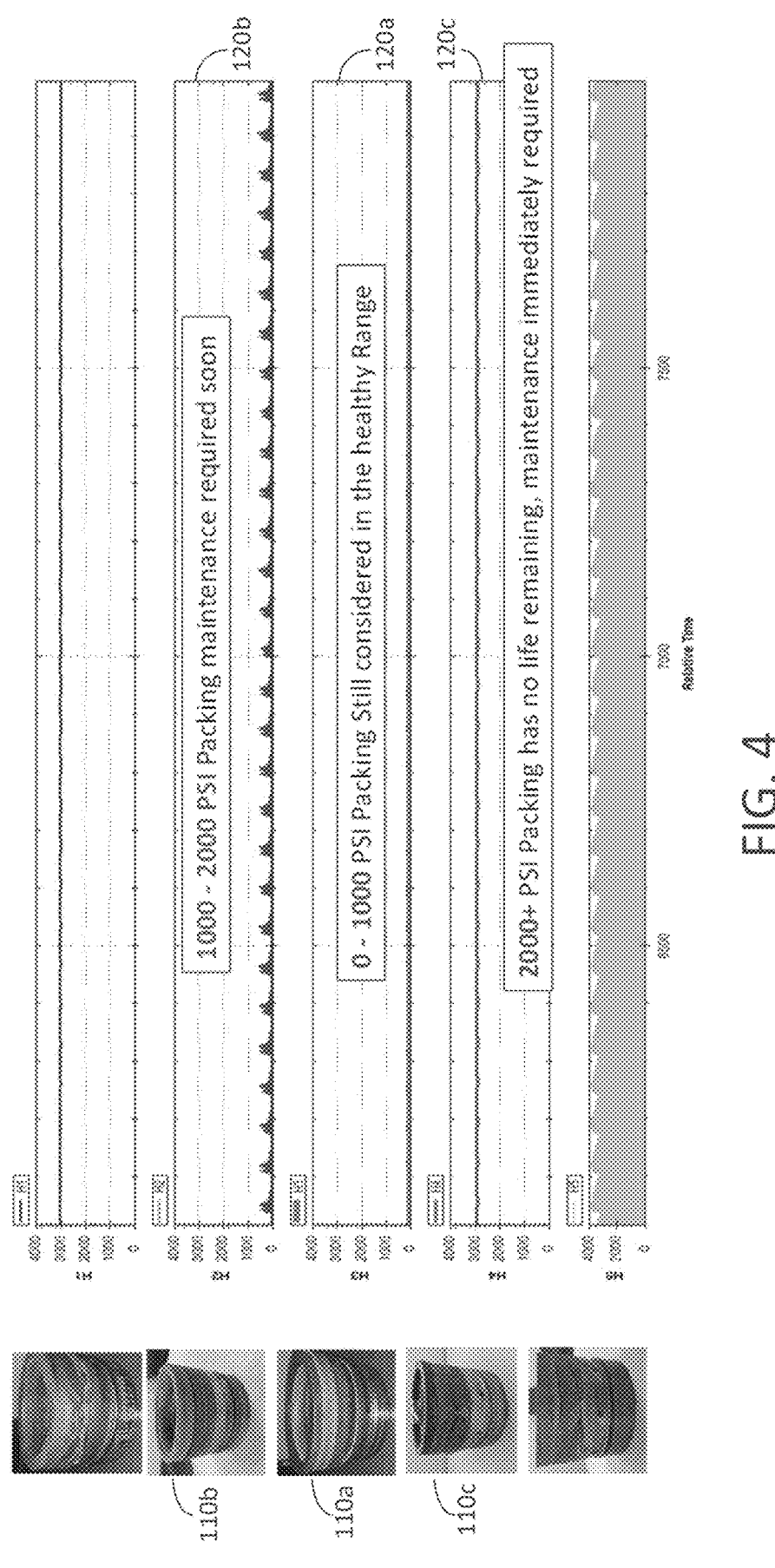
FIG. 4 illustrates various packing pressure traces with corresponding pump packings used with the pressure-based pump packing condition monitoring system, wherein the packings are shown in multiple stages of packing conditions.
Figure 5A:
FIG. 5A shows a close-up picture of a pump packing shown in FIG. 4, wherein the packing is in good condition.
Figure 5B:
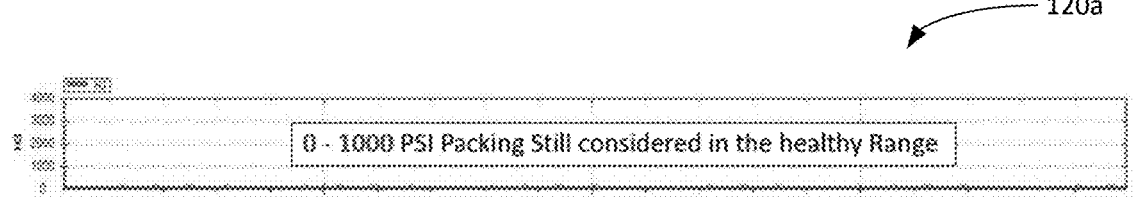
FIG. 5B is a close-up view of the packing pressure trace associated with the packing of FIG. 5A.

As previously noted, the packing 110 often will degrade over time, thereby reducing its ability to insulate various components of the fluid end from the pressures inside the bore 106. FIG. 4 shows five pictures of packing in various conditions ranging from excellent to failed, together with corresponding back pressure measurements. FIG. 5A is a close-up picture of packing 110*a* which is in excellent condition. This packing 110*a* protects the rest of the fluid end from the pressure of the fluid in the bore 106 relatively effectively, and the corresponding back pressure measurement 120*a* (seen in FIG. 5B) from the pressure sensor 120 is negligible. A packing in good condition, such as packing 110*a*, corresponds to a back pressure measurement 120*a* of between zero and approximately 1000 psi. At these back pressures, there is no need for the user to perform maintenance on the pump 100, since the packing 110 is operating as desired. Additionally, in embodiments where a pressure transducer 114*d* is incorporated within the lubrication line 114*a*, the pressure measurement would be expected to be in the "good range" (i.e., between 0 and 2000 psi). Those of skill in the art will appreciate that in other embodiments having different pump and/or packing configurations, packing in good condition may produce back pressure readings which traverse different ranges compared to the described embodiment without departing from the scope of the invention.

Figure 6A:
FIG. 6A shows a close-up picture of a pump packing shown in FIG. 4, wherein the packing is in poor condition.
Figure 6B:
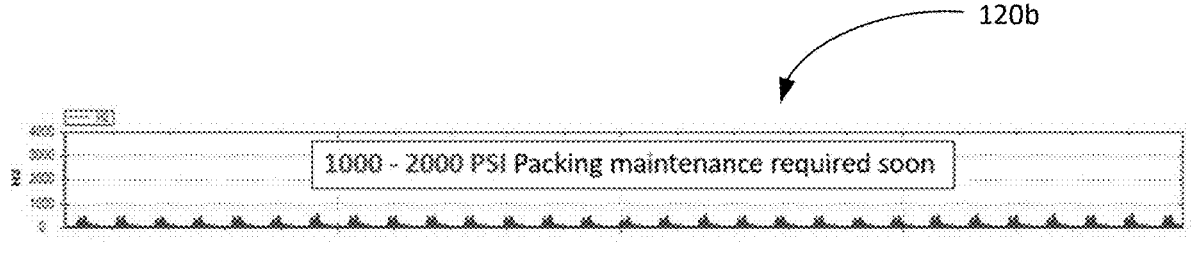
FIG. 6B is a close-up view of the packing pressure trace associated with the packing of FIG. 6A.

FIG. 6A is a close-up picture of packing 110*b* which is in a poor condition, at least relative to that of packing 110*a*. It can be seen in FIG. 6A that the packing 110*b* is starting to exhibit signs of wear in that cracks are beginning to form. The back pressure measurements 120*b* for the packing 110*b* shown in FIG. 6B are substantially larger than that of packing 110*a*. In the illustrated embodiment, the packing 110*b* produces back pressure measurements ranging from approximately 1000 psi to approximately 2000 psi. At such back pressures, a user may desire to replace the packing 110*b* in order to prevent any catastrophic failure. Here, the pressure measurement from the main lubrication line pressure transducer 114*d* may be expected to be within the "warning" range, i.e., from between approximately 2000-3000 psi. Those of skill in the art will again appreciate that in other embodiments having different pump and/or packing configurations, packing in poor condition may produce back pressure readings which traverse different ranges compared to the described embodiment.

Figure 7A:
FIG. 7A shows a close-up picture of a pump packing shown in FIG. 4, wherein the packing has failed and/or is unusable.
Figure 7B:
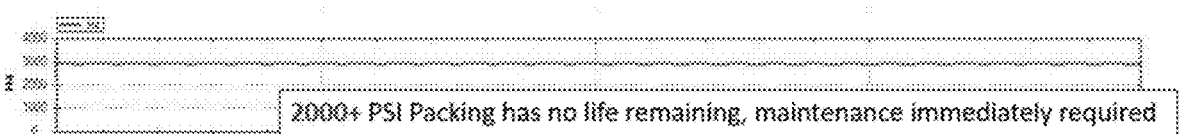
FIG. 7B is a close-up view of the packing pressure trace associated with the packing of FIG. 7A.
Figure 8:
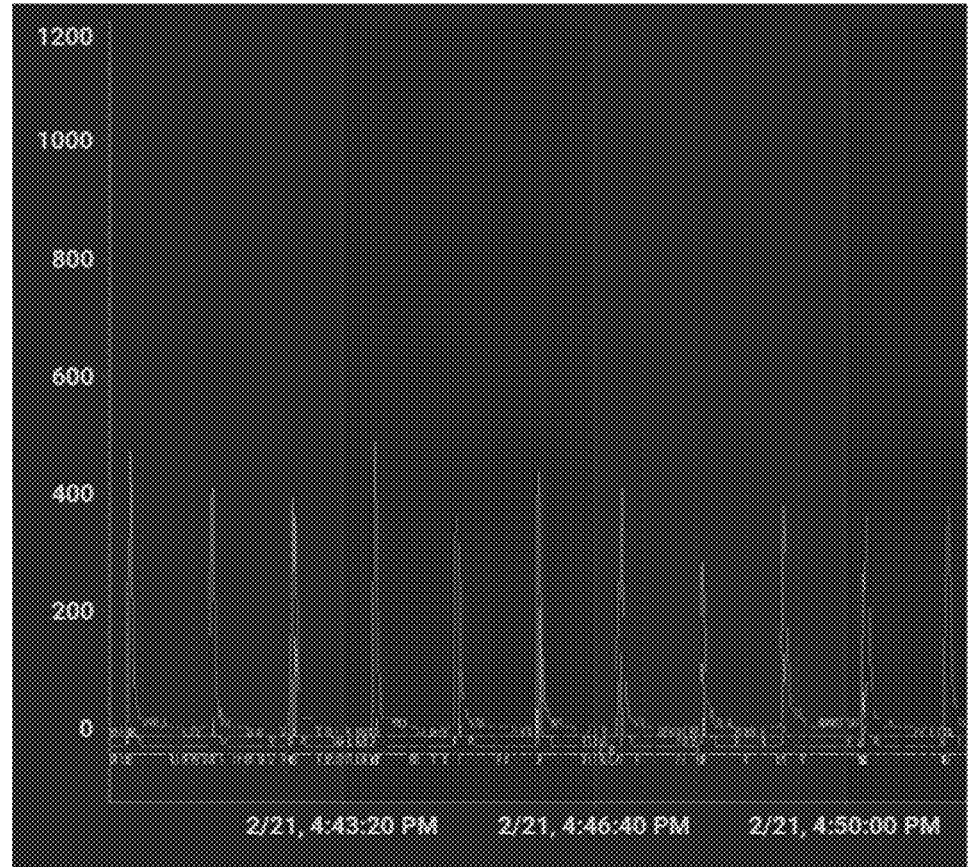
FIG. 8 is an example overlay of multiple pressure readings for a given cycle of a pump, according to an embodiment of the invention.

Turning to FIG. 7A, a close-up picture of packing 110*c*, which has failed and/or is weakened beyond its usable life, is illustrated. The back pressure measurements 120*c* shown in FIG. 7B exceed approximately 2000 psi. With such a damaged packing, the pressure measurement 120*c* is consistently elevated such that there is virtually no distinction between cycles—the packing 110*c* is effectively nonexistent. Any pump with damaged packing such as packing 110*c* may be at a substantial risk of total failure or catastrophic damage. In this scenario, the pressure measurement from the main lubrication line pressure transducer 114*d* may be expected to be at the "critical" level, i.e., at or in excess of approximately 3000 psi. Again, in other embodiments having different pump and/or packing configurations, packing in an inoperable or substantially inoperable condition may produce back pressure readings which traverse different ranges compared to the described embodiment without departing from the scope of the invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims.

What is claimed is:

1. A pump, comprising:
   a fluid end having a bore hole and a plunger configured to pressurize fluid within the bore hole, a packing located between the plunger and a side wall of the bore hole, and a packing lubrication system in fluid communication with the packing, the lubrication system having a lubricant source and a valve for selectively allowing flow of lubricant to the packing;

a power end configured to provide reciprocating motion to the plunger; and a packing health monitoring system, comprising:

a first pressure sensor incorporated into an isolation block connected to the fluid end between the bore hole and the valve for measuring a back pressure within the fluid end;

a control system in data communication with the first pressure sensor; and an alert generator in data communication with the first pressure sensor and the control system;

wherein the control system is configured to compare the back pressure to a first predetermined threshold of about 1000 psi, and the alert generator generates a first alert upon the back pressure meeting or exceeding the first predetermined threshold.

2. The pump of claim 1, wherein the alert generator generates a second alert when the control system determines the back pressure equals or exceeds 2000 psi.

3. The pump of claim 2, wherein each of the first and second alerts is an audial indicator and/or a visual indicator.

4. The pump of claim 2, wherein the packing health monitoring system further comprises an output display in data communication with the control system, and wherein the alerts are shown on the output display.

5. The pump of claim 1, wherein the packing monitoring system further comprises an output display in data communication with the control system, and wherein the output display displays the back pressure from the pressure sensor in real time.

6. The pump of claim 5, wherein the output display further displays the first alert.

7. The pump of claim 1, further comprising a second pressure sensor located between the lubricant source and the valve for monitoring lubricant pressure.

8. The pump of claim 7, wherein the control system determines performance criteria of the lubrication system based on the lubricant pressure from the second pressure sensor.

9. A method of monitoring packing health in a pump comprising a fluid end having a bore hole and a plunger configured to pressurize fluid within the bore hole, a packing located between the plunger and a side wall of the bore hole, a packing lubrication system in fluid communication with the packing, the lubrication system having a lubricant source and a valve for selectively allowing flow of lubricant to the packing, a power end configured to provide reciprocating motion to the plunger, a packing health monitoring system comprising a pressure sensor incorporated into an isolation block connected to the fluid end between the bore hole and the valve for measuring a back pressure within the fluid end, a control system in data communication with the pressure sensor, and an alert generator in data communication with the pressure sensor and the control system, the method comprising:

determining the back pressure via the pressure sensor;

comparing the back pressure to a first predetermined threshold of about 1000 psi via the control system; and generating an alert if the back pressure exceeds the first predetermined threshold.

10. The method of claim 9, further comprising:

comparing the back pressure to a second predetermined threshold; and generating a second alert if the back pressure exceeds the second predetermined threshold.

11. The method of claim 10, wherein the second predetermined threshold is about 2000 psi.

12. The method of claim 9, wherein the lubrication system further includes a pressure second sensor located between the lubrication source and the valve for measuring a lubricant pressure in a lubricant line.

13. The method of claim 12, further comprising:

determining the lubricant pressure in the lubricant line; and generating an alert if the lubricant pressure exceeds a predetermined lubricant pressure threshold.

* * * * *